United States Patent
Santovi

[15] 3,658,408
[45] Apr. 25, 1972

[54] SAFETY REFLECTOR DEVICE FOR VEHICLES

[72] Inventor: George A. Santovi, 4043 West 83rd Street, Chicago, Ill. 60652

[22] Filed: May 7, 1969

[21] Appl. No.: 822,651

[52] U.S. Cl. ............................................................. 350/97
[51] Int. Cl. .......................................................... G02b 5/12
[58] Field of Search ................................. 350/97–108, 172; 248/156, 87, 44, 27.8, 288, 347; 116/63, 173

[56] References Cited

UNITED STATES PATENTS

| | | | |
|---|---|---|---|
| 1,796,233 | 3/1931 | Barns | 350/97 |
| 2,213,708 | 9/1940 | Lange | 350/107 X |
| 2,645,977 | 7/1953 | Wilford | 350/97 |
| 2,793,561 | 5/1957 | Jacobus | 350/288 X |
| 3,058,711 | 10/1962 | Kingsford | 248/156 X |
| 2,779,240 | 1/1957 | Gaydos | 350/106 |

FOREIGN PATENTS OR APPLICATIONS

| | | | |
|---|---|---|---|
| 14,265 | 6/1913 | Great Britain | 350/97 |
| 547,789 | 2/1922 | France | 350/107 |
| 1,314,581 | 12/1961 | France | 116/63 |
| 1,035,990 | 7/1966 | Great Britain | 350/172 |

OTHER PUBLICATIONS

Popular Science, Vol. 177 No. 1 - " Distress Signal"

Primary Examiner—David Schonberg
Assistant Examiner—Michael J. Tokar
Attorney—Julius L. Solomon

[57] ABSTRACT

This invention relates to a safety device, and in particular, to a reflector structure of high visibility for use in connection with vehicles such as motorcycles, bicycles, etc., the structure comprising a hollow cylinder whose outer surface is covered with a highly reflective sheeting material or highly reflective paint, and a means for easily clamping the cylinder to the vehicle. The device is provided with means for allowing the reflector to be used as a stationary light reflecting signal when the vehicle operator encounters trouble on the road.

7 Claims, 5 Drawing Figures

INVENTOR.
GEORGE A SANTOVI
BY Julius L. Solomon

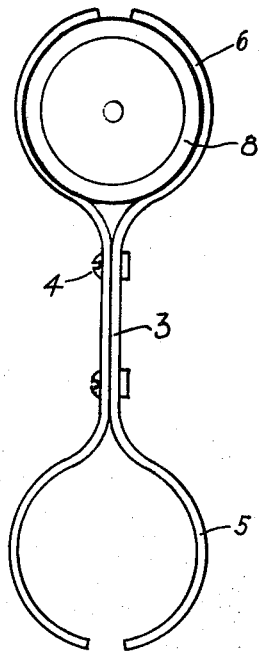
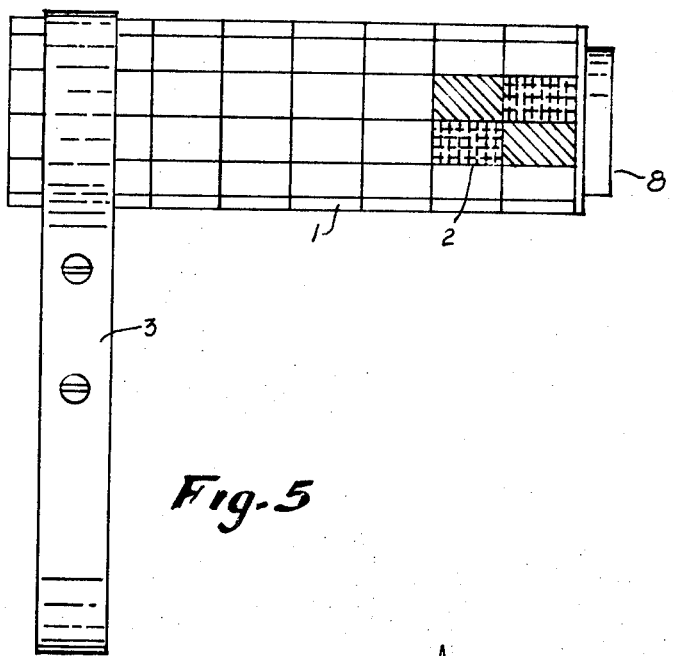
Fig. 1
Fig. 5
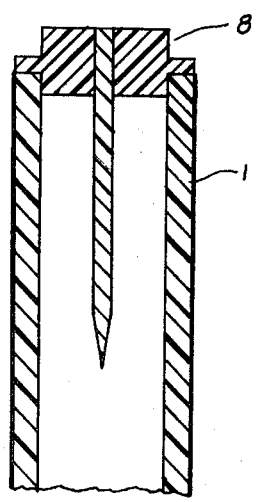
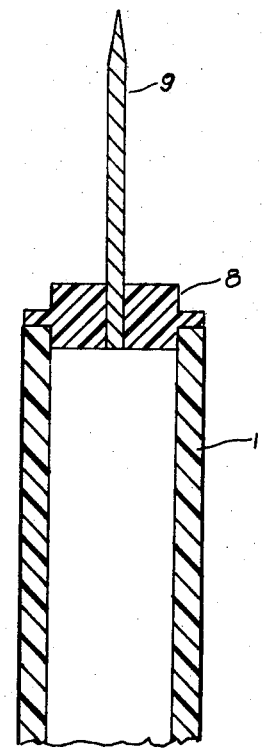
Fig. 2
Fig. 3
INVENTOR.
GEORGE A. SANTOVI
BY Julius L. Solomon

SAFETY REFLECTOR DEVICE FOR VEHICLES

This invention relates to safety devices for motorcycles, bicycles and such vehicles and, in particular, to a reflector device for use in conjunction with such vehicles which renders the vehicle, whether moving or standing still, more visible so that the possibility of accidental collision is measurably reduced.

In reflector devices such as are commonly used as present, the reflector is in the form of a small faceted glass permanently mounted by means of a screw and bolt to the rear fender of the vehicle. Reflectors of this type are small, are limited in reflection value and give one a false sense of security inasmuch as the driver of an overtaking vehicle traveling at high speed would have difficulty seeing the small reflector or would see the reflector too late to avoid a collision. The known reflectors heretofore used for this purpose are effective only over a narrow angle of view, it being necessary that the light being reflected and the viewer be placed along a line normal to the plane of the reflector. The reflectors being mounted at the rear of the vehicle do not give the driver of an oncoming vehicle any help in sensing the approach of the motorcycle either in daylight or at night in the event that the lights on the vehicle have failed. The known reflectors are ineffective in signalling vehicles approaching at right angles to the motorcycles of the cycle.

The present invention has for its object to provide a reflector device that has utility in moving or stationary vehicles and which provides the maximum of light sensation to the driver of an approaching vehicle.

Another object of the invention is to provide a reflector which can be seen from any angle of view over a range of 360°.

Another object of the invention is to provide a reflector which can easily be mounted on existing vehicles without the necessity of making modifications to the vehicle.

Still another object is to provide a reflector structure which can readily be removed from the vehicle and used as a warning signal near the vehicle in the event of a breakdown of the vehicle.

Another object is to provide such a reflector structure which has a reflective brilliance 15 to 20 times greater than a white painted surface whether viewed in daylight or at night.

Another object is to provide a reflective surface which may be patterned and has a pleasing appearance.

Another object is to provide a reflector that gives the viewer a sweeping effect of moving light of great brilliance when the vehicle is moving at high speed, which is readily sensed and noticed by a person in an oncoming vehicle.

Other objects and a fuller understanding of the invention may be had by referring to the following description and claims taken in conjunction with the accompanying drawings in which:

FIG. 1 is a drawing showing the end view of one form of the invention.

FIG. 2 is a sectional view of an embodiment of the invention.

FIG. 3 is a sectional view of an embodiment of the invention showing its assembly ready for use in its alternate form.

FIG. 5 shows a side view of one form of the invention.

Figure 4:
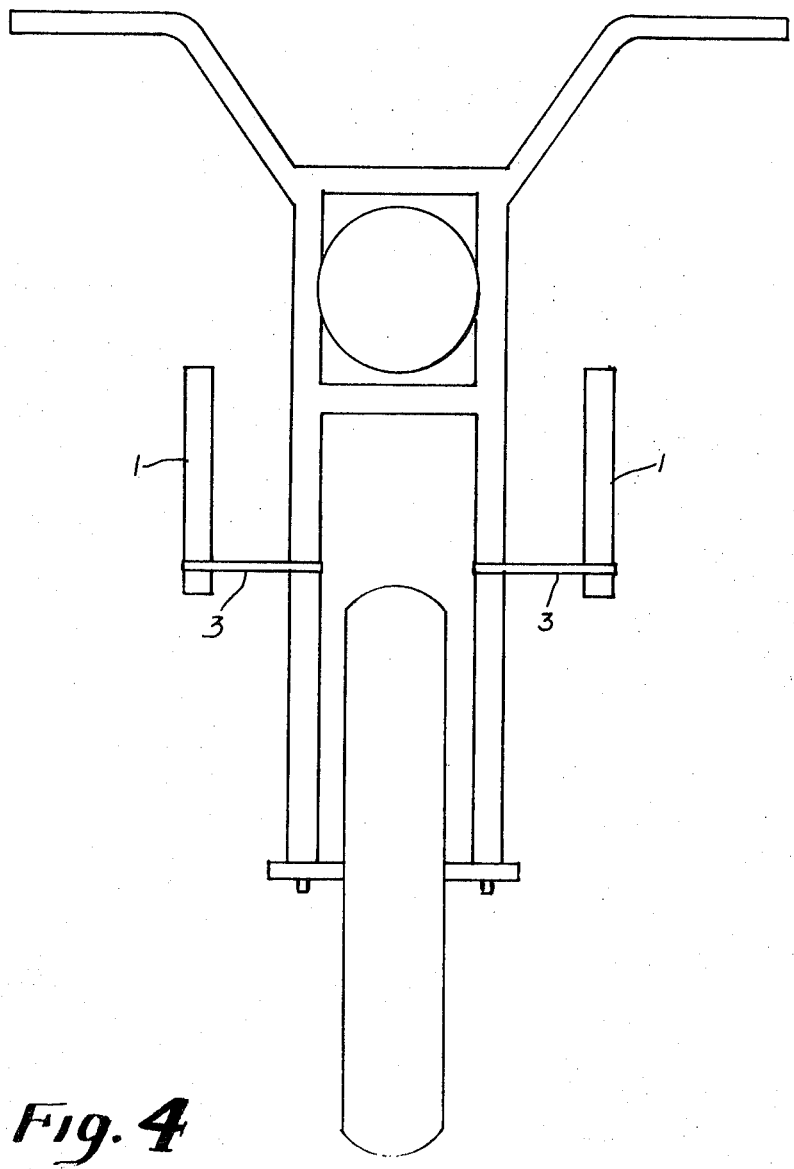
FIG. 4 is a pictorial view of the invention as it is shown in position on the forks of a typical cycle.

In the reflector device illustrated in FIG. 1 the body 1 of the cylindrical form is covered with a high reflectance coating 2. The reflective coating may be in the form a reflective sheet which is applied by a suitable adhesive to the surface of the cylinder or may be in the form of a reflective paint which may be made from a binder in which small glass balls are permeated. The reflective sheeting may be either of the type in which the glass reflecting spheres are imbedded and covered with an epoxy binder or in which a portion of the tiny glass sphere reflectors are imbedded in the plastic binder but project above surface. The reflective sheeting or paint may be applied in the form of a distinctive pattern on the surface of the cylinder so as to give the reflector an appearance which is appealing. The clamp 3 is designed so that the reflector body is securely held by the circular section 6. The formed section 5 is designed so that it clamps around the front forks or rear wheel supports or the hydraulic shock absorber body of the vehicle by means of the screws and bolts 4. The clamp may be secured to the reflector and vehicle so as not to loosen with the normal vibration and motion of the vehicle. The reflectors may be mounted with any orientation with respect to the vehicle either horizontally or vertically or at any desired angle in a plane parallel to or perpendicular to a plane passing through both wheels of the vehicle. The reflector should preferably be approximately 2 inches in diameter and 9 inches long in minimum dimension. Because of its cylindrical shape it may be viewed from any angle and will therefore provide a signal to drivers approaching, from any direction, the vehicle upon which the reflector is mounted. By means of the novel construction as shown in FIGS. 2 and 3 the reflector may be utilized to provide a signal of high brilliance and by a judicious selection of those colors which are of the frequency between 5,000 and 5,500 Angstrom units, the range in which the average human eye has the greatest acuity of vision, a safety device of the greatest efficacy may be realized.

The reflective coating is arranged in an alternating pattern of colors which correspond to the colors of those two frequencies to which the eye is most sensitive under the condition of photoptic vision and the condition of scoptic vision.

The human eye responds to a range of wavelengths which is slightly greater than 4,000 to 7,000 Angstrom units. The retina, however, does not respond equally to light of different wavelengths. For instance, a yellow surface would have a must higher luminance than a blue surface which was reflecting the same amount of energy from the same area due to the eye being highly actinic to yellow light.

Furthermore, the exact spectral response of the eye is dependent upon its state of adaptation, as, when vision changes from photopic to scotopic, the spectral response curve or luminosity curve moves toward the lower wavelength of the spectrum. This phenomenon is termed the "Purkinje Shift."

The maximum sensitivity of the normal light adapted eye occurs at 5,500 Angstrom units (yellow-green) under conditions of photopic vision, that is, when the luminance of the visual field is high. The maximum sensitivity of the eye under conditions of scotopic vision, that is, when the luminance level is low, shifts to 5,000 Angstrom units. Under daylight the vision would be photopic, at night it would be scotopic and at twilight the vision would be a combination of the two.

By utilizing reflective coatings in an alternating pattern of patches of color at 5,000 Angstrom units and 5,500 Angstrom units a reflector of maximum visual effect is obtained. The reflector of the present invention is so arranged in alternating pattern so as to obtain this desirable effect and thus result in a combination of the greatest effectiveness.

FIG. 2 shows the novel structure by means of which the reflector may be utilized as a flare-like device in the event of a vehicle failure while on the road. The end cap 8 acts as a closure for the tube from which the reflector is fashioned. The cap is fashioned as shown in FIG. 2 in disc form with a spike 9 extending from one face of the disc. The cap 8 is made in such a manner that it may be inserted in the tube in either of two ways.

If it is inserted as shown in FIG. 2, the spike 9 extends inside the reflector tube and the reflector is in condition for mounting onto the vehicle by means of the clamp 5.

If the cap is installed so that the spike 9 extends outward from the tube as shown in FIG. 3, the reflector may be used as a stationary warning reflector by pushing the spike 9 into the ground. Several reflectors being normally used per vehicle, these may be dismounted from the vehicle and the cap 8 reversed in the tube 1 and the spike 9 then inserted into the ground at spaced intervals in the direction of possible oncoming traffic.

FIG. 4 shows how the reflectors may be mounted to the forks and rear wheel supports of a motorcycle. Because of the large size of the cylindrical reflectors and because of the excellent reflective properties of the reflective sheeting material the reflectors may be seen from a great distance and, therefore, allow oncoming traffic to take those measures necessary to avoid collision with the motorcycle.

Although the invention has been described in its preferred form with a certain degree of particularity, it is understood that the present disclosure of the preferred form has been made only by way of example and that changes in construction and the arrangement of the parts may be resorted to without departing from the spirit and scope of the invention as hereinafter claimed.

What is claimed is:

1. A safety reflector device for use in conjunction with moving vehicles, comprising a hollow cylinder, means for reflecting light of a frequency to which the eye is most sensitive under high intensity ambient light conditions, a second means for reflecting light of a frequency to which the eye is most sensitive to under low intensity light conditions, the two reflecting means being fastened respectively to the cylinder in alternate fields on the outer surface of the said cylinder in a checkerboard pattern and clamping means for fastening the said reflector device to a vehicle, one of said reflecting means reflects only white light of a frequency of 5,000 Angstrom units, and said second means for reflecting light reflects only light of a frequency of 5,500 Angstrom units.

2. In a safety reflector as in claim 1 in which the diameter of the said cylinder is 2 inches minimum and its length a minimum of 9 inches.

3. In a safety reflector device as in claim 1 a cap for closing one end of the said cylinder, the said cap being in disc form and provided with means for holding the said disc to the end of the said cylinder and means for limiting the travel of the said disc into the end of the cylinder.

4. In a safety reflector as in claim 3 in which the said disc is provided with a spike extending outwardly and normal to one of the flat faces of the said disc.

5. In a safety reflector as in claim 4 in which the said disc is provided with means to allow a portion of the disc to be inserted a predetermined distance into one end of the said cylinder with either one of its two faces disposed outward of the end of the said cylinder.

6. In a safety reflector as in claim 5 in which the said disc is constructed with a flange at the center of its circular periphery in which the outer dimension of the flange is equal to the outer dimension of the cylinder and in which the outer diameter of the remaining portion of the disc is of a dimension to provide a holding fit with the inside diameter of the said cylinder.

7. In a safety reflector as in claim 6 in which the reflecting material has a reflection factor of at least 95 percent and has a color which lies in the range of frequencies between 5,000 and 5,500 Angstrom units.

* * * * *